US011302118B2

(12) United States Patent
Luo et al.

(10) Patent No.: US 11,302,118 B2
(45) Date of Patent: Apr. 12, 2022

(54) METHOD AND APPARATUS FOR GENERATING NEGATIVE SAMPLE OF FACE RECOGNITION, AND COMPUTER DEVICE

(71) Applicant: Tencent Technology (Shenzhen) Company Limited, Shenzhen (CN)

(72) Inventors: Wenhan Luo, Shenzhen (CN); Linchao Bao, Shenzhen (CN); Yuan Gao, Shenzhen (CN); Wei Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 100 days.

(21) Appl. No.: 17/016,162

(22) Filed: Sep. 9, 2020

(65) Prior Publication Data
US 2020/0410266 A1 Dec. 31, 2020

Related U.S. Application Data

(63) Continuation of application No. PCT/CN2019/093273, filed on Jun. 27, 2019.

(30) Foreign Application Priority Data

Aug. 2, 2018 (CN) .......................... 201810869295.4

(51) Int. Cl.
*G06K 9/36* (2006.01)
*G06V 40/40* (2022.01)
(Continued)

(52) U.S. Cl.
CPC ........... *G06V 40/40* (2022.01); *G06K 9/6256* (2013.01); *G06V 40/172* (2022.01); *G06V 40/50* (2022.01)

(58) Field of Classification Search
CPC .... G06K 9/6256–9/6259; G06V 40/50–40/58; G06V 40/172; G06V 40/16–40/179; G06V 40/40–40/45
See application file for complete search history.

(56) References Cited

U.S. PATENT DOCUMENTS 11,080,517 B2 * 8/2021 Wu ...................... G06V 40/168
2005/0220336 A1 10/2005 Sabe et al.

FOREIGN PATENT DOCUMENTS

| CN | 103679158 A | 3/2014 |
| CN | 103824055 A | 5/2014 |

(Continued)

OTHER PUBLICATIONS

Tencent Technology, WO, PCT/CN2019/093273, Sep. 24, 2019, 3 pgs.

(Continued)

*Primary Examiner* — Brian Werner
(74) *Attorney, Agent, or Firm* — Morgan, Lewis & Bockius LLP

(57) ABSTRACT

This application discloses a method of generating a negative sample for face recognition performed at a computer device. The method includes: obtaining a positive sample of a face from a training sample library required for machine learning of face recognition; embedding the obtained positive sample in a selected negative sample template, to obtain an intermediate sample of the face that simulates displaying of the positive sample in a display region of the negative sample template; and fusing the intermediate sample in a selected scenario sample, to obtain a negative sample of the face required for machine learning of face recognition.

18 Claims, 7 Drawing Sheets

(51) Int. Cl.
  *G06K 9/62* (2022.01)
  *G06V 40/50* (2022.01)
  *G06V 40/16* (2022.01)

(56) References Cited

FOREIGN PATENT DOCUMENTS

| CN | 105096354 A | | 11/2015 | |
|---|---|---|---|---|
| CN | 106503617 A | | 3/2017 | |
| CN | 107609462 A | | 1/2018 | |
| CN | 107798390 A | | 3/2018 | |
| CN | 108197279 A | * | 6/2018 | ............ G06F 16/51 |
| CN | 108197279 A | | 6/2018 | |
| CN | 108229325 A | | 6/2018 | |
| CN | 108229344 A | | 6/2018 | |
| CN | 108229555 A | | 6/2018 | |

OTHER PUBLICATIONS

Tencent Technology, IPRP, PCT/CN2019/093273, Feb. 2, 2021, 4 pgs.
Tencent Technology, ISR, PCT/CN2019/093273, Sep. 24, 2019, 2 pgs.

* cited by examiner

METHOD AND APPARATUS FOR GENERATING NEGATIVE SAMPLE OF FACE RECOGNITION, AND COMPUTER DEVICE

CROSS REFERENCE TO RELATED APPLICATIONS

This application is a continuation application of PCT Patent Application No. PCT/CN2019/093273, entitled "METHOD AND APPARATUS FOR GENERATING NEGATIVE SAMPLE OF FACE RECOGNITION, AND COMPUTER DEVICE" filed on Jun. 27, 2019, which claims priority to Chinese Patent Application No. 201810869295.4, entitled "METHOD AND APPARATUS FOR GENERATING NEGATIVE SAMPLE OF FACE RECOGNITION, AND COMPUTER DEVICE" filed on Aug. 2, 2018, all of which are incorporated by reference in their entirety.

FIELD OF THE TECHNOLOGY

This application relates to the field of image processing technologies, and in particular, to a method and apparatus for generating a negative sample of face recognition, and a computer device.

BACKGROUND OF THE DISCLOSURE

At present, face recognition is mainly performed through a face recognition model. The face recognition model is obtained through training and learning based on a large quantity of training samples by using a machine learning method. The training samples involved in machine learning may be classified into two categories, namely, a positive sample and a negative sample. The positive and negative samples need to be determined according to actual to-be-verified content. The positive sample refers to a sample from which a correct conclusion can be drawn, and the negative sample is the opposite.

However, in an actual application process, the positive sample and the negative sample often differ significantly in quantity. For example, there are a large quantity of positive samples but only a small quantity of negative samples.

SUMMARY

Embodiments of this application provide a method and apparatus for generating a negative sample of face recognition, and a computer device.

According to a first aspect, a method for generating a negative sample of face recognition is performed at a computer device having a processor and memory storing a plurality of programs to be executed by the processor, the method comprising:

obtaining a positive sample of a face from a training sample library required for machine learning of face recognition;

embedding the obtained positive sample in a selected negative sample template, to obtain an intermediate sample of the face that simulates displaying of the positive sample in a display region of the negative sample template; and fusing the intermediate sample in a selected scenario sample, to obtain a negative sample of the face required for machine learning of face recognition.

According to a second aspect, a computer device is provided, including:

at least one processor; and a memory communicatively connected to the at least one processor;

the memory storing a plurality of programs executable by the at least one processor, the plurality of programs, when executed by the at least one processor, causing the computer device to perform the method according to the first aspect.

According to a third aspect, a non-transitory computer-readable storage medium is provided, the non-transitory computer-readable storage medium, storing a plurality of programs that, when executed by a processor of a computer device, cause the computer device to perform the method according to the first aspect.

BRIEF DESCRIPTION OF THE DRAWINGS

To describe technical solutions in embodiments of this application or in the related art more clearly, the following briefly describes accompanying drawings required for describing the embodiments or the related art. The accompanying drawings described in the following are merely for the embodiments of this application.

DESCRIPTION OF EMBODIMENTS

Figure 1A:
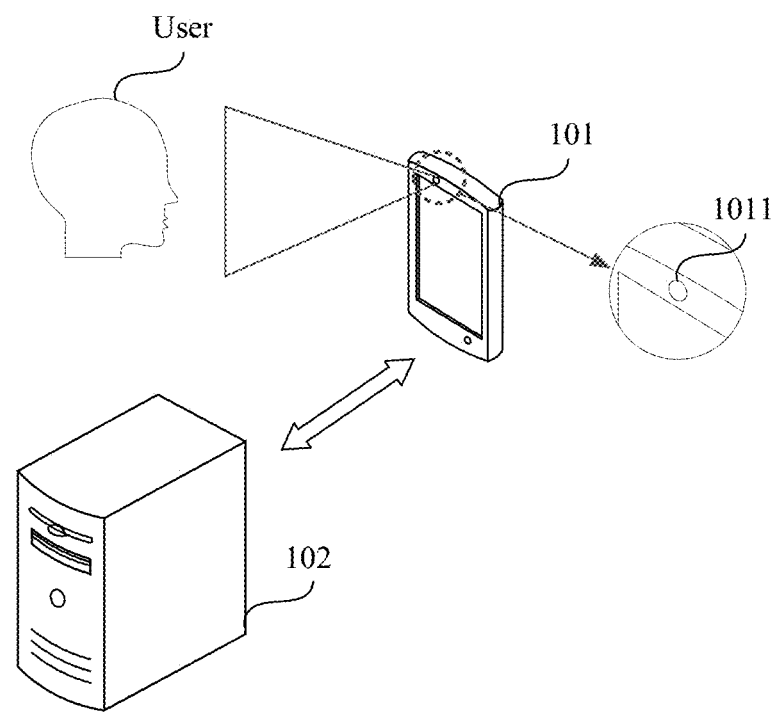
FIG. 1A is a schematic diagram of a scenario according to an embodiment of this application.

To make objectives, technical solutions, and advantages of this application more comprehensible, the following clearly and completely describes the technical solutions in the embodiments of this application with reference to accompanying drawings in the embodiments of this application. The described embodiments are only some embodiments rather than all the embodiments of this application. In a case that no conflict occurs, the embodiments in this application and the features in the embodiments may be mutually combined. In addition, although a logical order is shown in the flowcharts, in some cases, shown or described steps may be performed in an order different from the order shown herein.

To help understand the technical solutions provided in the embodiments of this application, some key items used in the embodiments of this application are explained herein first.

Positive sample and negative sample: In face recognition, a positive sample and a negative sample are relative. The positive sample refers to a sample that is successfully verified after a face recognition model recognizes the sample. The negative sample refers to a sample that is unsuccessfully verified after the face recognition model recognizes the sample. Certainly, whether the verification succeeds is determined according to a specific scenario. For example, if whether a to-be-verified picture is of a face needs to be verified, a face picture can be successfully verified, while a picture that does not include a face or includes only a small part of a face cannot be successfully verified.

Alternatively, for example, when a user makes a payment by using a terminal, a payment system usually requires the user to perform face authentication to verify whether the user is operating in person. The user, or referred to as a first user, usually turns on a camera on the terminal to shoot a picture of his/her face for authentication. In such a case, the picture, shot by the first user, of the face of the first user may be considered to be a positive sample. However, the payment may be made not by the first user in person but by a second user by operating an account of the first user. In such a case, the second user usually performs authentication through a photo of the first user or a picture or video of the face of the first user that is stored on a terminal. Such a case is obviously dangerous, and a picture shot in such a case may be considered to be a negative sample, or referred to as an attacking sample.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects in a case in which no special description is provided.

In a specific practice process, in such cases as the need to verify whether the user is operating in person when the payment is made, if a negative sample is successfully verified, the account of the first user is in danger, and the property security of the first user cannot be guaranteed. Therefore, verification with a negative sample is usually not allowed to succeed. A function of face authentication is performed based on a face recognition model. For the face recognition model, a positive sample and a negative sample need to be input, and features in the positive sample and the negative sample are learned through an established face recognition model, so that a finally obtained face recognition model can correctly distinguish the positive sample from the negative sample. Therefore, to prevent face authentication of the negative sample from succeeding when the foregoing case occurs, it is necessary to add the negative sample when training a face authentication model, so that the model may learn features of the negative sample. In this way, the negative sample may be accurately distinguished when the foregoing case occurs, to fail the face authentication of the negative sample and guarantee the account security of the first user.

In practical life, a majority of users normally perform face authentication, and therefore a quantity of positive samples is sufficient. However, common users rarely operate as in the foregoing case in which the second user performs face authentication by using a photo of the first user or a picture or video of the first user that is stored on a terminal, and consequently operating the account of the first user, generally. Therefore, few negative samples may be obtained by an authentication system. As a result, the positive samples and the negative samples differ significantly in quantity. Consequently, the accuracy of a face recognition model obtained through training by using the positive samples and the negative samples cannot be ensured.

It is found that face recognition is mainly used for identity authentication, and in an actual application scenario, a most common means of an attacker is to deceive a live face authentication system by using a photo or video of an authorized user. The photo may be carried on a photo paper or displayed on a hand-held terminal of the attacker. The video is generally played on the hand-held terminal of the attacker. In such a case, in an image obtained by the live face authentication system, there is a frame-like thing around the photo or the video, and a background appears behind the photo or the terminal. Based on such a case, to obtain a negative sample, a negative sample template is designed by simulating such a framework. The negative sample template is used for simulating a photo or a hand-held terminal device having a display screen. Further, because a positive sample is easy to obtain, that is, a quantity of positive samples is sufficient, the positive sample may be embedded in the negative sample template with a background, to generate a negative sample by using the positive sample. In this way, a quantity of negative samples may be greatly increased, to resolve the significant difference between the positive samples and the negative samples in quantity. In view of this, the embodiments of this application provide a method for generating a negative sample of face recognition. In the method, a positive sample may be embedded in a negative sample template, and fused in a common scenario sample to simulate a scenario in which an attack is performed by using a negative sample in life scenarios, and obtain a negative sample required for machine learning of face recognition. In this manner, many negative samples may be generated according to positive samples, so that the current situation of an excessively small quantity of negative samples because of a small quantity of attacks in face recognition scenarios in life may be effectively resolved, thereby improving the performance of a face recognition model obtained through training. The common scenario sample may be a static photo of a common venue such as a cashier in a shopping mall or an airport transit gate, or may be a video with dynamic crowds.

In addition, it is further considered that in practical life, for example, when the second user performs face authentication by using a photo of the first user that is stored on the terminal, because of light reflection, shadows of other objects are unavoidably reflected on a display unit of the terminal, and these shadows fall in a region of the photo of the first user that is displayed by the display unit. Then, to make a finally obtained negative sample more authentic, in the method of the embodiments of this application, after the obtained positive sample is embedded in the negative sample template and a first intermediate sample is obtained, an element of a reflective picture may be further added to the first intermediate sample, to simulate a scenario in which an object is reflected into the first intermediate sample in real scenarios, to form a second intermediate sample.

Further, it is further considered that when an attack is performed during face recognition, generally, a camera of an authentication system does not directly face an attacking sample, but has a spatial position relationship with the attacking sample. Therefore, a geometric distortion may be performed on the second intermediate sample before the second intermediate sample is fused in the scenario sample. In this way, a finally obtained negative sample is more in line with a real situation and more authentic.

After the design idea of the embodiments of this application is described, the following briefly describes application scenarios to which the technical solutions of the embodiments of this application may be applied. The following application scenarios are merely used to describe the embodiments of this application, but not used to limit this application. In a specific implementation process, the technical solutions provided in the embodiments of this application may be flexibly applied according to an actual requirement.

FIG. 1A shows an application scenario to which the technical solutions in the embodiments of this application may be applied. The scenario may include a terminal 101 and a server 102.

The terminal 101 includes a camera 1011. In a possible scenario, the terminal 101 may be a personal terminal. The personal terminal may be, for example, a personal mobile phone or a portable android device (PAD) of a user. For example, when an account of an application program on the terminal 101 of the user requires face authentication, the camera of the terminal 101 is turned on to shoot an image including the face of the user, and the image is transmitted to the server 102. The terminal 101 may communicate with the server 102 through a network. The network may be a wired network or a wireless network. The wireless network may be, for example, a mobile cellular network or a wireless local area network (WLAN). Certainly, the network may alternatively be any other network available for communication. This is not limited in this embodiment of this application.

After receiving the image including the face of the user and transmitted by the terminal 101, the server 102 may perform recognition on the image including the face of the user through a face recognition model in the server 102, to determine whether a person who is performing a face authentication operation is the user in person, and feeds back a determining result to the terminal 101. The face recognition model in the server 102 is obtained through training and learning according to a plurality of positive samples and negative samples. The negative samples may be negative samples obtained according to the technical solutions provided in the embodiments of this application.

In another possible scenario, the terminal 101 may be a terminal device in an enterprise or a public institution, for example, a computer device in a government office lobby, a bank counter, or a hotel reception desk. The computer device may include a camera 1011. The camera 1011 may be a camera included in the terminal 101, or an external camera 1011 connected to the terminal 101. The terminal 101 may collect certificate (which is usually an identity card) information of a user handling business, shoot a face picture of the user handling business through the camera 1011, and then transmit the information and the picture to the server 102 together. The server 102 performs recognition on the face picture of the user through a face recognition model, to determine whether the user handling business matches the provided identity information, and feeds back a determining result to the terminal 101. The face recognition model in the server 102 is obtained through training and learning according to a plurality of positive samples and negative samples. The negative samples may include negative samples obtained according to the technical solutions provided in the embodiments of this application.

Figure 1B:
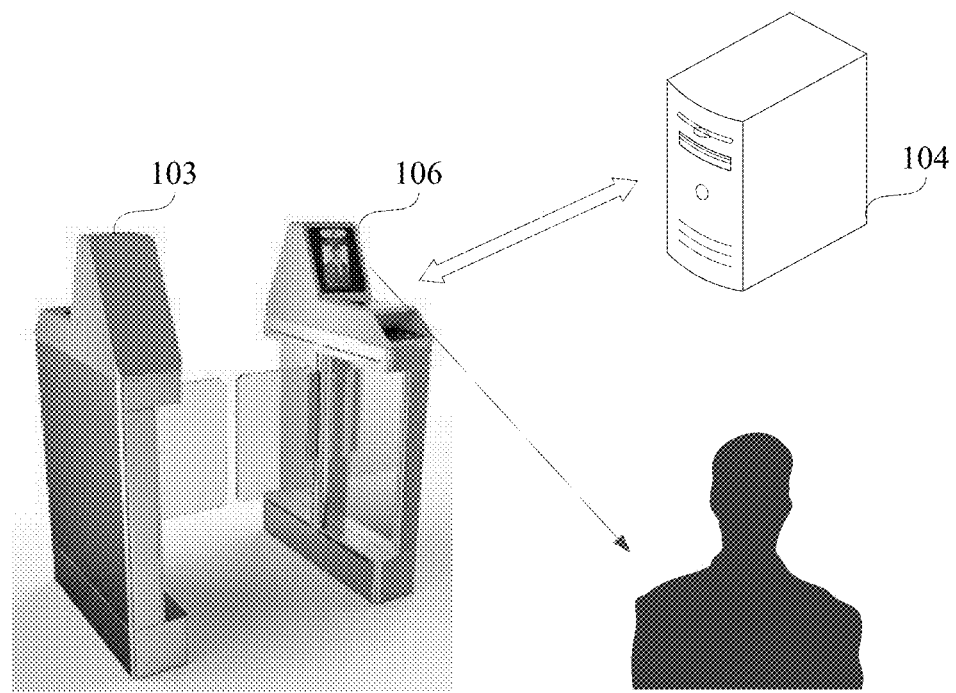
FIG. 1B is a schematic diagram of another scenario according to an embodiment of this application.

FIG. 1B shows another application scenario to which the technical solutions in the embodiments of this application may be applied. The application scenario is, for example, a security check system. The scenario may include a gate 103 and a server 104.

The gate 103 may be, for example, a gate at a security check entrance of an airport, a gate at a ticket entrance of a railway station, or a gate at a security check entrance of a metro station. The gate 103 includes one or more cameras, which can shoot an image 106 including the face of a user through the camera, collect certificate information of the user, and transmit the information to the server 104 for verification. The server 104 may be a corresponding verification server in the security check system. For example, when the gate 103 is a gate at a security check entrance of an airport, the server 104 is a verification server in an airport security check system. The server 104 performs recognition on the image including the face of the user through a face recognition model in the server 104, to determine whether the user who is undergoing security check matches information in an identity card, and feeds back a determining result to the terminal 103. The face recognition model in the server 104 is obtained through training and learning according to a plurality of positive samples and negative samples. The negative samples may be negative samples obtained according to the technical solutions provided in the embodiments of this application.

Certainly, the method provided in the embodiments of this application is not limited to the application scenarios shown in FIG. 1A and FIG. 1B, and may be applied to other possible application scenarios, which is not limited in the embodiments of this application.

To further describe the technical solutions provided in the embodiments of this application, the following describes the technical solutions in detail with reference to the accompanying drawings and specific implementations. Although the embodiments of this application provide the operation steps of the method shown in the following embodiments or accompanying drawings, the method may include more or fewer operation steps. For steps between which there is no necessary causal relationship logically, an execution order of these steps is not limited to the execution order provided in the embodiments of this application. The method, when performed in a practical processing process or by an apparatus, may be performed according to an order of the method shown in an embodiment or an accompanying drawing or concurrently performed.

Figure 2:
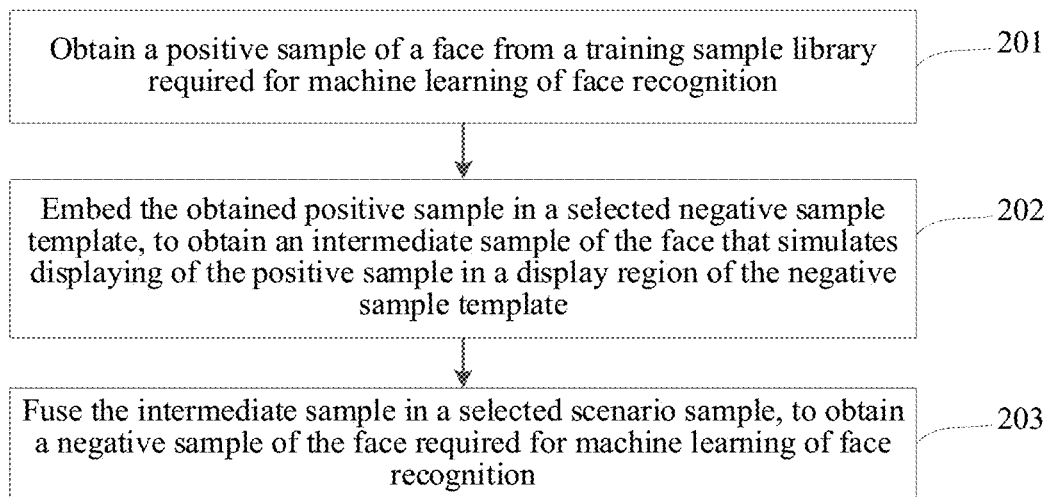
FIG. 2 is a schematic flowchart of a method for generating a negative sample of face recognition according to an embodiment of this application.

FIG. 2 is a flowchart of a method for generating a negative sample of face recognition according to an embodiment of this application. As shown in FIG. 2, the method includes the following steps:

Step 201: Obtain a positive sample of a face from a training sample library required for machine learning of face recognition.

Step 202: Embed the obtained positive sample in a selected negative sample template, to obtain an intermediate sample of the face that simulates displaying of the positive sample in a display region of the negative sample template.

Step 203: Fuse the intermediate sample in a selected scenario sample, to obtain a negative sample of the face required for machine learning of face recognition.

In this embodiment of this application, the positive sample is embedded in the negative sample template, and then a background is added, to simulate a scenario in which an attack is performed by using a negative sample in life scenarios, and obtain the negative sample required for machine learning of face recognition. In this way, because a quantity of positive samples is sufficient, many negative samples may be generated according to the positive samples, so that the technical problem of an excessively small quantity of negative samples because of a small quantity of attacks in face recognition in life may be effectively resolved, thereby improving the performance of a face recognition model obtained through training.

According to this embodiment of this application, in step 202, the embedding the obtained positive sample in a selected negative sample template may include:

pre-processing the positive sample so that a pre-processed positive sample is adapted to a size of the display region of the negative sample template in the negative sample template; and embedding the pre-processed positive sample in the negative sample template.

In this embodiment of this application, when the positive sample is embedded in the negative sample template, it is necessary to pre-process the positive sample, so that a size of the positive sample is adapted to the size of the display region in the negative sample template, the obtained intermediate sample is closer to a real life scenario, thereby improving the authenticity of the obtained negative sample.

According to this embodiment of this application, in step 203 in FIG. 2, before the fusing the intermediate sample in a selected scenario sample, to obtain a negative sample required for machine learning of face recognition, the method for generating a negative sample of face recognition may further include:

pre-processing a selected reflective picture based on a size of the intermediate sample; and performing the following processing on the intermediate sample: using the intermediate sample as a foreground, and synthesizing the intermediate sample and a pre-processed reflective picture, to simulate reflections of the reflective picture in the intermediate sample.

In this embodiment of this application, in practical life, because of light reflection, a negative sample unavoidably includes a reflection effect formed through reflection of another object, and therefore, an element of a reflective picture may be further added to the intermediate sample, thereby improving the authenticity of the obtained negative sample.

According to this embodiment of this application, the using the intermediate sample as a foreground, and synthesizing the intermediate sample and a pre-processed reflective picture may include:

synthesizing the intermediate sample and the pre-processed reflective picture according to a first weight value of the intermediate sample and a second weight value of the reflective picture, the first weight value being greater than a preset weight threshold, the second weight value being less than or equal to the preset weight threshold.

In this embodiment of this application, when the reflective picture and the intermediate sample are synthesized, a weight of the reflective picture is less than a weight of the intermediate sample. In this way, content of an intermediate sample obtained after the synthesis is mainly content of the intermediate sample before the synthesis, and content of the reflective picture does not affect a visual effect too much, which is more in line with a real scenario, thereby improving the authenticity of the obtained negative sample.

According to this embodiment of this application, in step 203, the fusing the intermediate sample in the scenario sample may specifically include:

performing at least one geometric distortion on the intermediate sample, the intermediate sample after the geometric distortion including a mask used for indicating a position of the intermediate sample before the geometric distortion in the intermediate sample after the geometric distortion; and fusing the intermediate sample after the geometric distortion in the scenario sample according to the mask.

In this embodiment of this application, when an attack is performed during face recognition, generally, a camera does not directly face an attacking sample, but has a spatial angle. Therefore, a geometric distortion may be performed on the intermediate sample before the intermediate sample is fused in the scenario sample. In this way, a finally obtained negative sample is more in line with a real situation and more authentic.

In the foregoing embodiment, the negative sample template may be a template of a terminal with a display function, and the display region may be a display screen region of the terminal; and/or the scenario sample may include a scenario photo or a scenario video.

Figure 3:
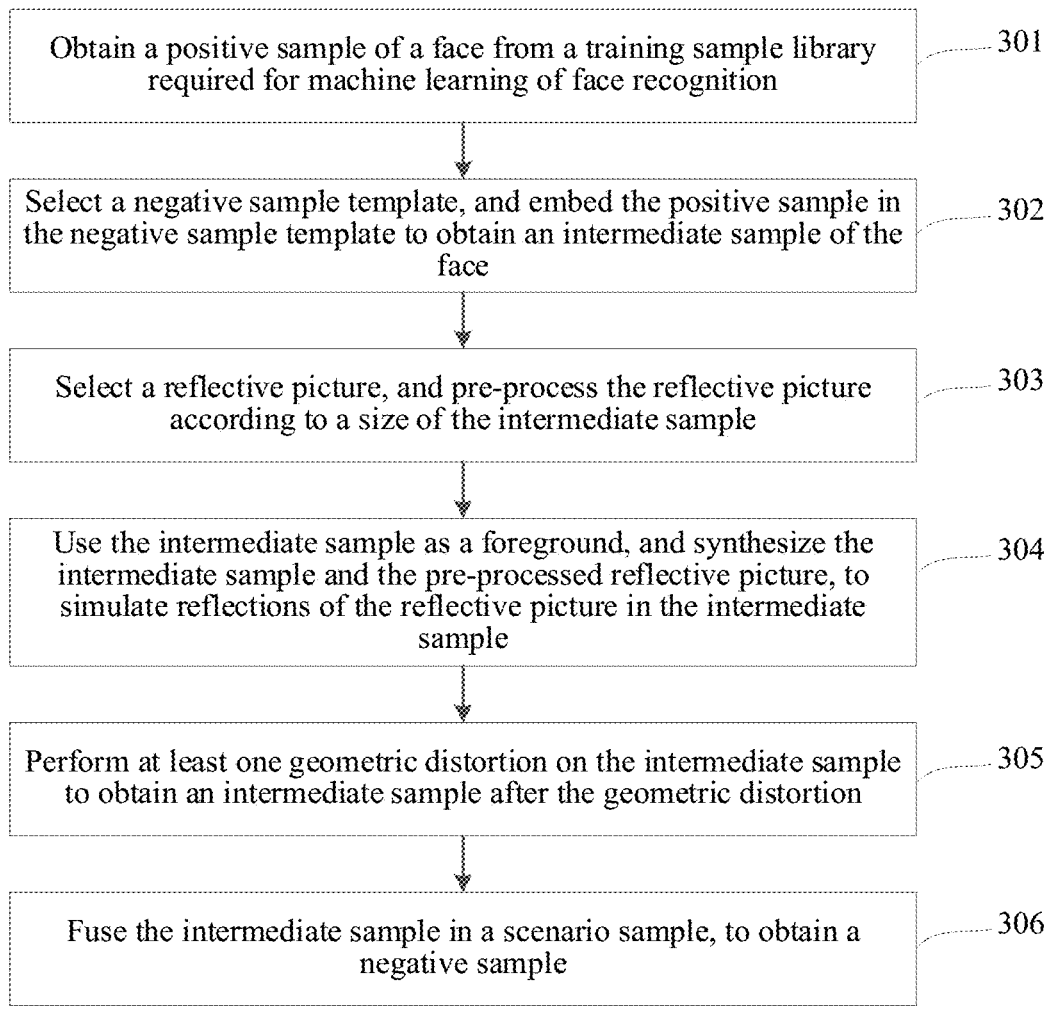
FIG. 3 is a schematic flowchart of a method for generating a negative sample of face recognition according to an embodiment of this application.

FIG. 3 is another schematic flowchart of a method for generating a negative sample of face recognition according to an embodiment of this application. Referring to FIG. 3, this embodiment of this application provides a method for generating a negative sample of face recognition. Using synthesis for a negative sample as an example below, a process of the method includes the following steps:

Step 301: Obtain a positive sample of a face from a training sample library required for machine learning of face recognition.

In this embodiment of this application, before a face recognition model is trained, a sample library used for machine learning needs to be pre-prepared. Sample libraries may be classified into a positive sample library and a negative sample library. Samples in the sample library may be pictures or videos shot by users during face authentication, or pictures or videos of faces obtained from a network. Certainly, a sample obtaining manner is not limited in this embodiment of this application.

For example, at present, many mobile phones can support a face unlock function. When wanting to unlock a mobile phone through a face, a first user may shoot a face picture of the first user through a camera of the mobile phone to perform an unlock operation. The face picture of the first user shot in such a case may be used as a positive sample. If a second user obtains the mobile phone of the first user and a face picture of the first user, the second user may shoot the face picture of the first user (the face picture of the first user may be, for example, displayed on a mobile phone of the second user) by using the mobile phone of the first user, to perform an unlock operation on the mobile phone of the first user. Such a case obviously cannot be allowed, and therefore the picture shot in such a case may be used as a negative sample.

In another example, when the first user handles business at a smart counter of a bank, the smart counter of the bank verifies whether the first user who is being shot is alive, in addition to verifying whether the face of the first user matches certificate information provided by the first user, that is, verifying whether a shot face picture of the first user matches a picture in the certificate information. Therefore, the smart counter of the bank usually requires the first user to complete a specified action such as blinking or nodding. That is, the smart counter of the bank records a video when the first user performs the specified action, and then performs the verification according to the video. Then, the video, shot by the smart counter of the bank, of completing the specified action by the first user may be used as a positive sample. If the second user plays, after obtaining the video of completing the specified action by the first user, the video before a camera of the smart counter of the bank with an expectation to complete verification through the video, the camera of the smart counter of the bank may shoot a video in which the second user plays, by using a terminal, the video of completing the specified action by the first user. Such a case obviously cannot be allowed either, and therefore the video shot by the camera in such a case may also be used as a negative sample.

In practical life, because a majority of users shoot pictures or videos of themselves according to a normal procedure to perform face authentication, positive samples are easy to obtain, and the obtained positive samples may be added to the positive sample library required for machine learning of face recognition. However, only a minority of users perform face recognition by fraudulently using pictures or videos of other users, and therefore a quantity of negative samples is extremely small. Therefore, in this embodiment of this application, a negative sample may be obtained through synthesis by using a positive sample, to reduce a difference between the positive samples and the negative samples in quantity, to improve the performance of a model obtained through training.

Specifically, during synthesis for a negative sample by using a positive sample, the positive sample needs to be selected from the positive sample library as a basis of the synthesis. Specifically, the positive sample may be selected randomly or according to an order. This is not limited in this embodiment of this application.

Step 302: Select a negative sample template, and embed the positive sample in the negative sample template to obtain an intermediate sample of the face.

In this embodiment of this application, considering that in an actual scenario, the second user generally performs face authentication by using a picture or video of the first user on the terminal of the second user, or holding a face photo of the first user by hand, a picture or video shot by an authentication terminal after a face authentication page is opened for user authentication further includes a frame-like thing. For example, when the second user performs face authentication through a picture displayed on the terminal of the second user, the authentication terminal unavoidably shoots an outline of the terminal of the second user. Alternatively, when the second user performs face authentication by holding a face picture by hand, the authentication terminal unavoidably shoots a hand of the second user. Therefore, a picture including such an element as the outline of the terminal or the hand may be used as a negative sample template to be subsequently embedded with a positive sample, to obtain a negative sample simulating a practical scenario.

Figure 4:
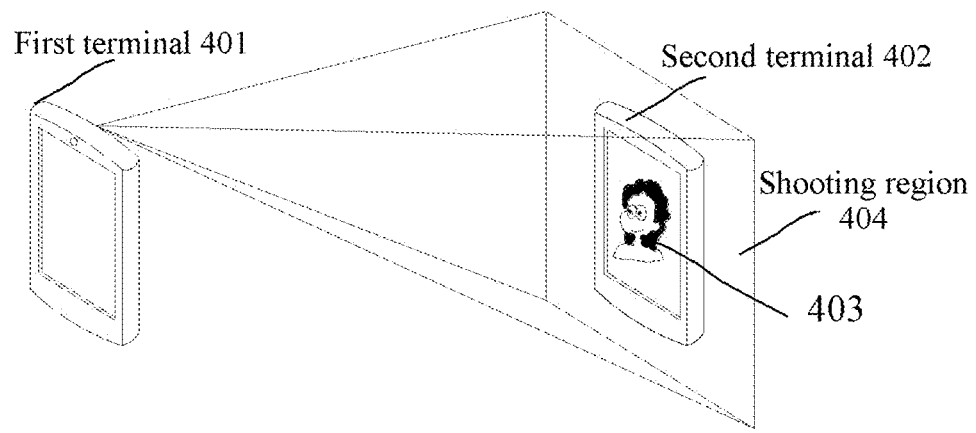
FIG. 4 is a schematic diagram of shooting a face picture on a second terminal by a first terminal according to an embodiment of this application.

For example, referring to FIG. 4, a first terminal 401 is an authentication device on which a face authentication page is opened, and a second terminal 402 is a device playing or displaying a picture or video of the first user. The second user plays a picture or video 403 of the first user through a display screen of the second terminal 402 before a camera of the first terminal 401. When the first terminal 401 performs face authentication by shooting the picture or video 403 displayed on the second terminal, the second terminal 402 falls in a shooting region 404 of the camera of the first terminal 401, so that a picture or video shot by the first terminal 401 includes an image of the second terminal 402. Then, in such a case, a negative sample may correspondingly include the image of the terminal. To simulate a negative sample in a real scenario, during synthesis for a negative sample by using a positive sample, the positive sample may be embedded in the image of the second terminal by using the image of the second terminal as a negative sample template, to simulate a scenario in which the positive sample is displayed on the display screen of the second terminal.

Figure 5:
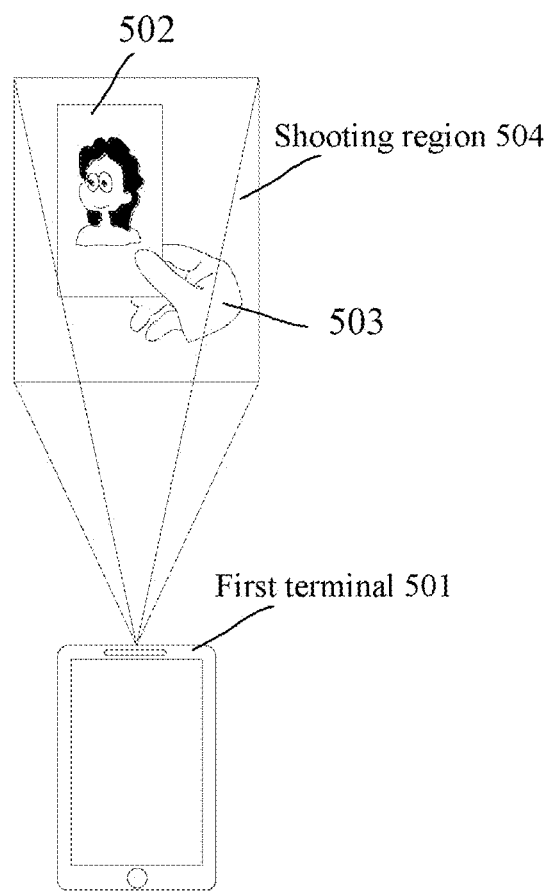
FIG. 5 is a schematic diagram of shooting a face picture held by hand by a first terminal according to an embodiment of this application.

For example, the second user may alternatively perform face authentication by directly using a printed face picture of the first user. Referring to FIG. 5, a first terminal 501 is an authentication device on which a face authentication page is opened. When the first terminal 501 shoots a face picture 502 of the first user, a hand 503 of the second user falls in a shooting region 504 of a camera of the first terminal, and therefore, a picture shot by the first terminal 501 may further include an image of the hand of the second user holding the face picture of the first user. In such a case, a negative sample may correspondingly include the image of the hand. A positive sample may be embedded in the image of the hand by using the image of the hand as a negative sample template, to simulate a scenario in which the holds the positive sample by hand.

Figure 6:
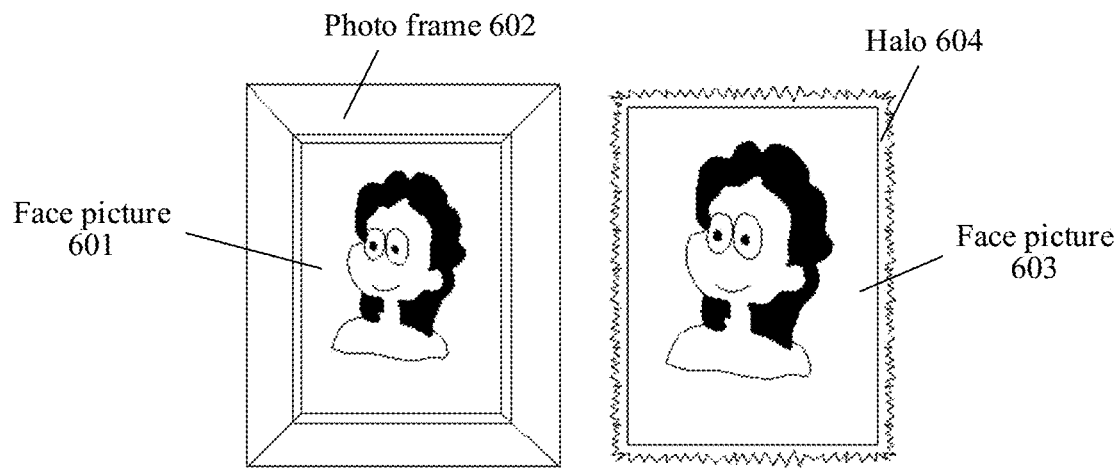
FIG. 6 is schematic diagrams of respectively putting a face picture in a face photo frame and a halo according to an embodiment of this application.

For example, as shown in the left diagram of FIG. 6, a face picture 601 of the first user may be further put in a photo frame 602, which is held by the second user before the first terminal to perform verification. Then, in such a case, a picture shot by the first terminal also includes the photo frame, and an image of the photo frame may also be used as a negative sample template used for synthesis for a negative sample. Alternatively, as shown in the right diagram of FIG. 6, the second user may directly put a face picture 603 of the first user on a flat surface, and then the first terminal shoots the face picture 603. In such a case, because of a light effect in the environment, there may be a halo 604 around the face picture in a picture shot by the first terminal, and an image of the halo may also be used as a negative sample template used for synthesis for a negative sample.

During specific implementation, images of terminals commonly used on the market, images of hands with different postures, images of photo frames with different appearances, images of halos, and the like may be obtained in advance as negative sample templates and added to a negative sample template library. During synthesis for a negative sample, a negative sample template may be selected from the negative sample template library. A form of the negative sample template may be specifically a picture such as a picture of a terminal. Alternatively, the form of the negative sample template may be a video. Then, all frames in the negative sample template may have the same content. For example, all the frames may be the picture of the terminal. The negative sample template may be specifically an object itself such as a terminal, a hand, or a photo frame.

Specifically, the negative sample template may be selected randomly or according to an order. This is not limited in this embodiment of this application.

In an embodiment of this application, after the positive sample and the negative sample template are obtained, the positive sample may be embedded in the negative sample template to obtain the intermediate sample that simulates displaying of the positive sample in the display region of the negative sample template.

Specifically, when the negative sample template is an image of a terminal with a display function, the display region specifically refers to a display screen region of the terminal. Alternatively, when the negative sample template is an image of a photo frame, the display region specifically refers to an inner frame region of the photo frame.

In this embodiment of this application, to adapt the positive sample to a size of the display region in the negative sample template, before the embedding operation is performed, the positive sample may be further pre-processed according to a size of the display region of the terminal, so that the intermediate sample obtained after the embedding operation may be more authentic.

Description is made below by using an example in which the positive sample is a face picture, and the terminal is specifically a mobile phone.

Figure 7:
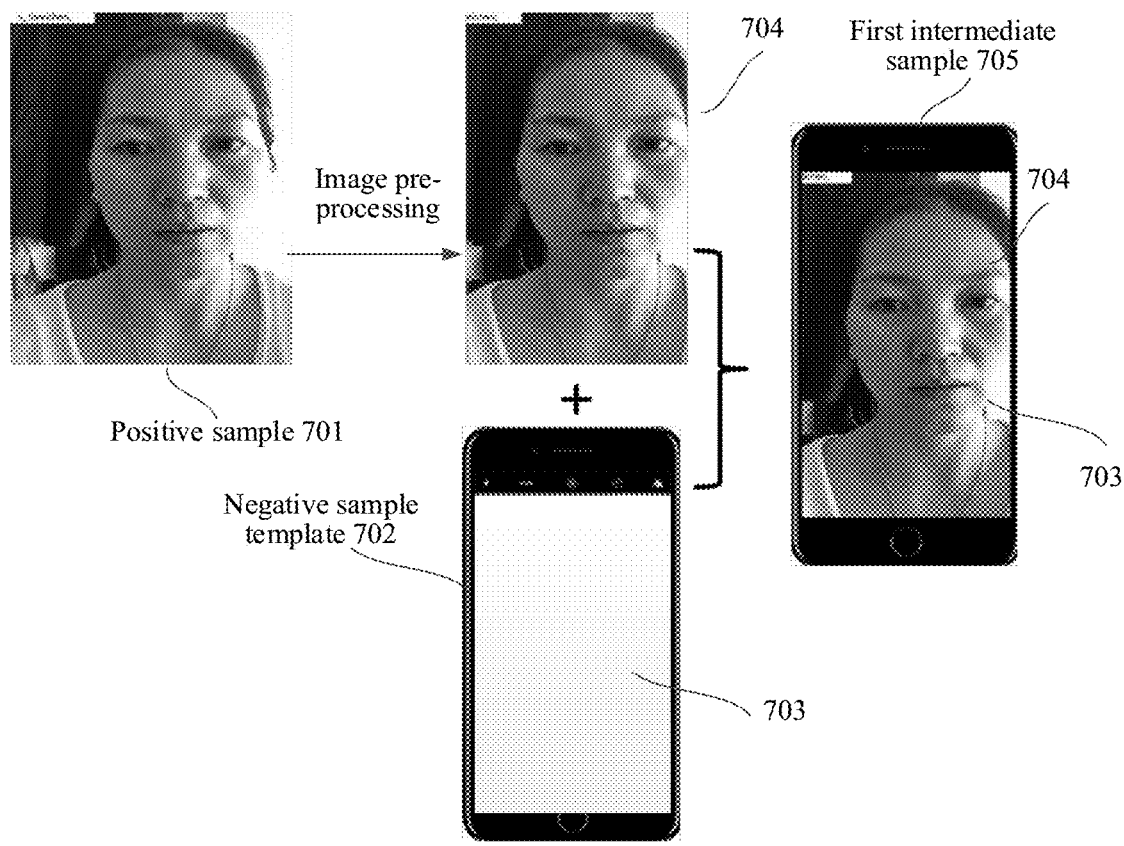
FIG. 7 is a schematic diagram of a embedding process according to an embodiment of this application.

Referring to FIG. 7, after a face picture 701 used as the positive sample is obtained, image pre-processing such as cropping and/or scaling may be performed on the face picture according to a size of a display screen 703 in a mobile phone image 702 used as the negative sample template, to obtain a pre-processed face picture 704. The scaling is a manner of zooming in/out the face picture to change a size of the face picture. The mobile phone shown in FIG. 7 is a black iPhone. Certainly, the mobile phone may alternatively be a mobile phone in another color, or a mobile phone of another brand.

After the face picture is pre-processed, the pre-processed face picture 704 may be embedded in the mobile phone image 702 to obtain a first intermediate sample 705. For example, as shown in FIG. 7, the pre-processed face picture 704 is put in the display screen region 703 of the mobile phone image, to simulate an effect of displaying the face picture on the mobile phone.

In this embodiment of this application, if the positive sample is a video, the negative sample template may be a picture or a video. For example, the video includes only content such as a terminal, a hand, a photo frame, or a halo. Specifically, the positive sample in the form of a video may also be pre-processed, and then embedded in the negative sample template. For example, a ratio of the video may be adjusted to adapt to the size of the display screen of the mobile phone, and then an adjusted video is embedded in the mobile phone image to simulate an effect of displaying the video on the mobile phone.

Step 303: Select a reflective picture, and pre-process the reflective picture according to a size of the intermediate sample.

In this embodiment of this application, considering that when the second user performs face authentication through the face picture or video of the first user in the terminal, or the second user holds the printed face picture of the first user by hand, because of light reflection, a background in the scenario unavoidably forms a reflection effect on the terminal or the printed face picture, in the technical solutions of this embodiment of this application, the reflection is also simulated.

Specifically, because the user may perform face authentication in a plurality of scenarios, many objects may be reflected on the face picture. For example, in an outdoor scenario, a reflected object may be, for example, a building or a trademark on the building. In an indoor scenario, a reflected object may be an indoor facility, such as a wallpaper, an air conditioner, or a TV. Pictures of objects in a plurality of indoor scenarios and objects in a plurality of outdoor scenarios may be collected as reflective pictures and added to a reflective picture library, so that a reflective picture may be selected from the reflective picture library during synthesis for the negative sample. Specifically, the selection may be performed randomly or according to an order. This is not limited in this embodiment of this application.

Because a size of a collected reflective picture generally does not directly match the intermediate sample, the reflective picture further needs to be pre-processed, so that the size of the reflective picture is consistent with the size of the intermediate sample. For example, when the negative sample template is a picture of a terminal, the pre-processing is specifically to enable the size of the reflective picture to be consistent with a size of the terminal in the picture of the terminal. Alternatively, when the negative sample template is a picture of a photo frame, the pre-processing is specifically to enable the size of the reflective picture to be consistent with a frame size of the photo frame in the picture of the photo frame.

For example, the negative sample template is still the mobile phone image. Then, the reflective picture may be cropped so that a size of a cropped reflective picture is the same as the size of the mobile phone in the mobile phone image. Alternatively, the reflective picture may be scaled, for example, horizontally scaled or vertically scaled, so that a size of a scaled reflective picture is the same as the size of the mobile phone. In a real scenario, there may be a spatial position relationship between a reflected object and a display screen of a mobile phone. Therefore, based on this consideration, in addition to the foregoing processing operation, a geometric distortion may be performed on the reflective picture so that the reflective picture in the intermediate sample is more authentic.

Step 304: Use the intermediate sample as a foreground, and synthesize the intermediate sample and the pre-processed reflective picture, to simulate reflections of the reflective picture in the intermediate sample.

In this embodiment of this application, after the reflective picture is pre-processed, the intermediate sample may be used as a foreground picture, and synthesized with the pre-processed reflective picture, to simulate reflections of the reflective picture in the intermediate sample.

Specifically, when the intermediate sample is a picture, the intermediate sample and the pre-processed reflective picture may be directly synthesized, and correspondingly, an intermediate sample after the synthesis is also a picture. Alternatively, when the intermediate sample is a video, each frame in the video and the reflective picture may be synthesized, and correspondingly, an intermediate sample after the synthesis is also a video. Pre-processed reflective pictures synthesized with different frames may be the same or different. For example, a pre-processed reflective picture synthesized with a first frame may be a first part of the original reflective picture, and a pre-processed reflective picture synthesized with a second frame may be a second part of the original reflective picture. The first part is different from the second part, but there may be an intersection between the first part and the second part, or there may be no intersection at all.

Figure 8:
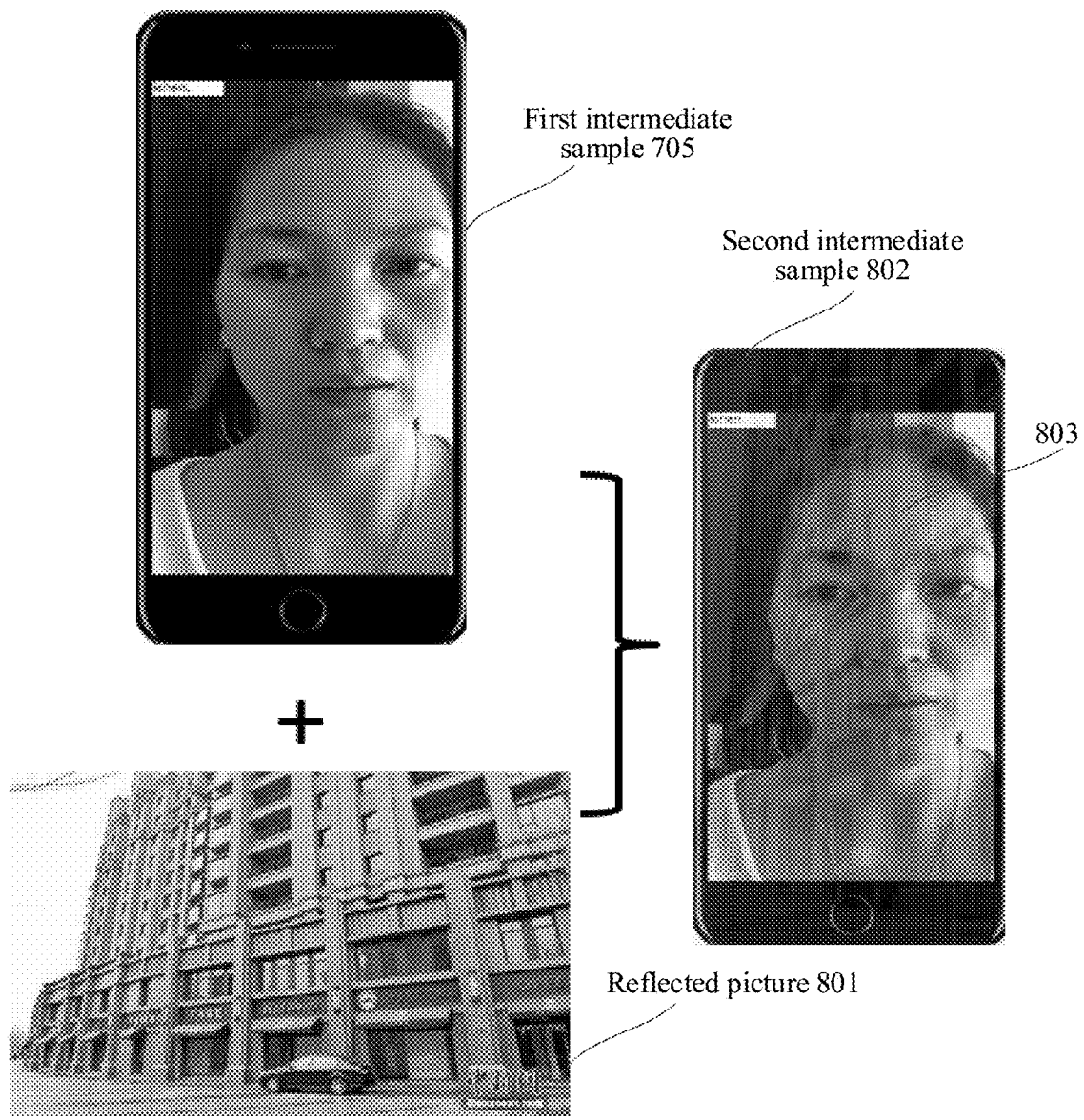
FIG. 8 is a schematic diagram of a process of synthesis with a reflective picture according to an embodiment of this application.

Specifically, a reflection effect formed when the reflective picture is synthesized on the display screen of the terminal in the picture of the terminal is generally shallow. In other words, in the intermediate sample after the synthesis, content having a main visual effect is still content of the intermediate sample before the synthesis, and content in the reflective picture has a weaker visual effect. FIG. 8 is a schematic diagram of synthesizing an intermediate sample (for example, the first intermediate sample 705 obtained in the manner in FIG. 7) and a reflective picture 801 before synthesis by using an example in which a positive sample is a face picture. It can be learned from FIG. 8 that in an intermediate sample (referred to as a second intermediate sample 802) after the synthesis, content of the intermediate sample (the first intermediate sample 705) before the synthesis is still dominant. Although a building 803 in the reflective picture may also be perceived, a perception effect is weaker.

To implement the effect of the intermediate sample (the second intermediate sample 802) after the synthesis shown in FIG. 8, when the synthesis is performed, a weight may be set for the reflective picture 801. Correspondingly, a weight of the intermediate sample (the first intermediate sample 705) before the synthesis is a complement of the weight of the reflective picture 801, and then the intermediate sample before the synthesis and the reflective picture may be synthesized according to respective weights.

Specifically, the weight of the intermediate sample (the first intermediate sample) before the synthesis is referred to as a first weight value, and the weight of the reflective picture is referred to as a second weight value. The first weight value and the second weight value complement each other. The first weight value is greater than a preset weight threshold, and the second weight value is less than or equal to the preset weight threshold. For example, when the second weight value is 0.1, the first weight value is 0.9 (that is, 1−0.1). The preset weight threshold may be a value set according to experience, or a value obtained based on a specific experiment. For example, the preset weight threshold may be 0.2.

The first intermediate sample and the pre-processed reflective picture may be synthesized through calculation by using the following formula:

$$S=(1-a)*I+a*R.$$

S represents the intermediate sample (the second intermediate sample) after the synthesis, I represents the intermediate sample (the first intermediate sample) before the synthesis, R represents the pre-processed reflective picture, and a is the second weight value. A value of a may be randomly selected from values meeting a requirement. Certainly, the value of a may alternatively be fixed.

The synthesis process based on the foregoing formula is a process of superimposing results of multiplying pixel values of all pixels in the intermediate sample (the first intermediate sample) before the synthesis and the pre-processed reflective picture by the respective weights.

Step 305: Perform at least one geometric distortion on the intermediate sample to obtain an intermediate sample of the face after the geometric distortion.

In a practical scenario, for example, the scenario shown in FIG. 4, it may be difficult to maintain a completely parallel state between the first terminal and the second terminal. That is, there is somehow a spatial position relationship between the first terminal and the second terminal. Alternatively, in a scenario shown in FIG. 5, it is also difficult to maintain a completely parallel state between the face picture held by the second user and the first terminal. Therefore, to make a finally obtained negative sample more authentic, one or more geometric distortions may be further performed on the intermediate sample, to obtain an intermediate sample after the geometric distortion, and then the subsequent synthesis process is performed.

The intermediate sample before the geometric distortion may be the intermediate sample (the second intermediate sample) after the synthesis that is obtained in step 304, or the intermediate sample (the first intermediate sample) obtained in step 302.

The geometric distortion may be perspective transformation or affine transformation. Certainly, the geometric distortion may alternatively be another type of transformation. This is not limited to this embodiment of this application.

Description is made below by using an example in which the geometric distortion is the perspective transformation.

Specifically, a transformation parameter of the perspective transformation may be fixed, or may be randomly selected during each perspective transformation. The transformation parameter may include, for example, a rotation angle or a stretching ratio.

Figure 9:
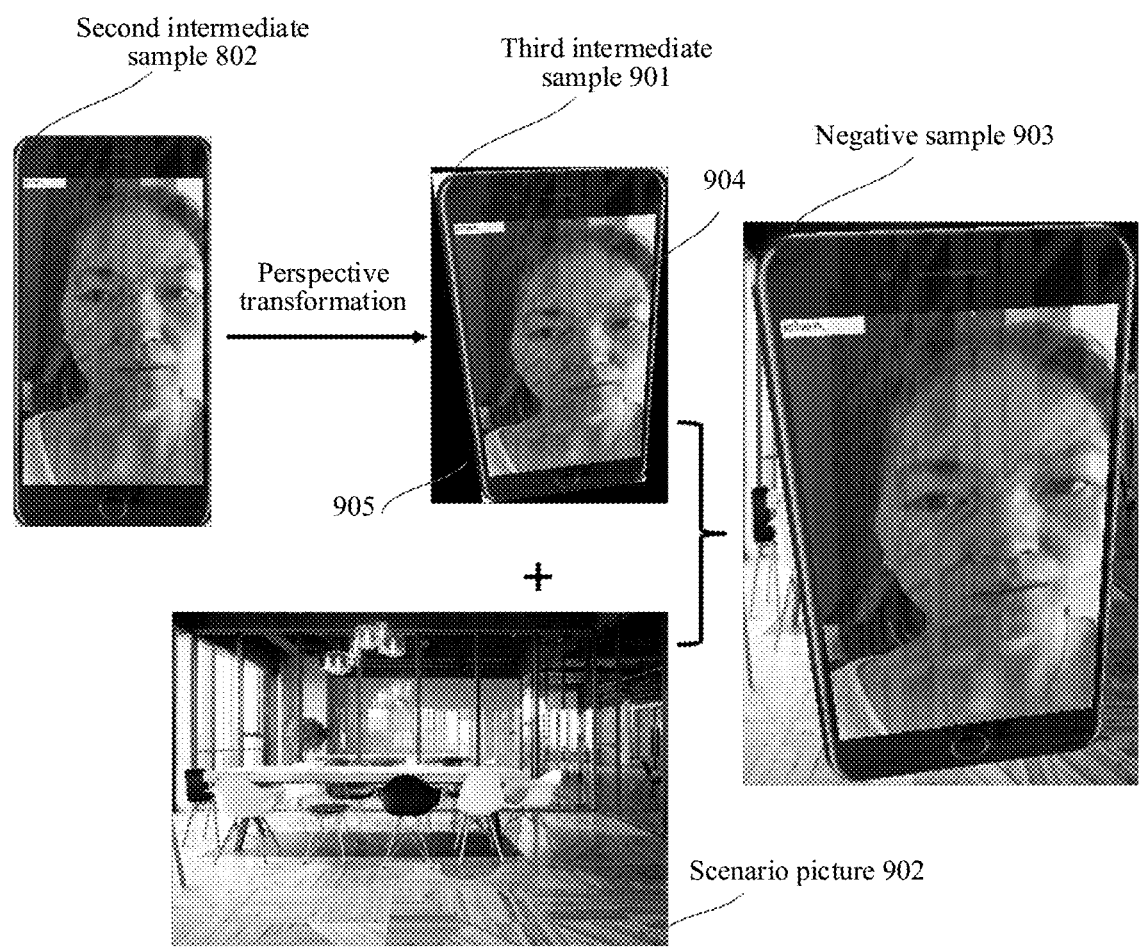
FIG. 9 is a schematic diagram of a process of fusion with a scenario picture according to an embodiment of this application.

Referring to FIG. 9, after the perspective transformation is performed on the second intermediate sample 802, a third intermediate sample 901 after the geometric distortion is obtained. The third intermediate sample 901 includes a mask 904 indicating a position of the intermediate sample before the geometric distortion in the intermediate sample after the geometric distortion. That is, an image region occupied by a mobile phone in the third intermediate sample 901 shown in FIG. 9 is the mask 904. Only pixels in the mask 904 have values, while pixels outside the mask 904 do not have values, and are specifically represented as a pure black region 905 shown in FIG. 9. The mask 904 helps fuse the intermediate sample after the geometric distortion in a scenario sample, which is specifically described below, and not further described herein.

Step 306: Fuse the intermediate sample in a scenario sample, to obtain a negative sample.

In this embodiment of this application, in a face authentication process, when a picture or a video is shot, a surrounding environment is unavoidably shot together, and therefore, to make a finally obtained negative sample closer to a real scenario, the intermediate sample may be further fused in a scenario, to finally obtain a negative sample. Specifically, the intermediate sample may be fused in a selected scenario sample, to obtain a negative sample required for machine learning of face recognition.

The intermediate sample mentioned herein may be the intermediate sample (the first intermediate sample) obtained in step 302, the intermediate sample (the second intermediate sample) after the synthesis that is obtained in step 304, or the intermediate sample (the third intermediate sample) obtained in step 305. That is, in this embodiment of this application, steps 303 to 305 are optional. In a specific implementation process, some or all of steps 303 to 305 may be flexibly selected according to an actual requirement to be performed.

Specifically, because the user may perform face authentication in a plurality of scenarios, and the scenarios may be generally classified into an indoor scenario and an outdoor scenario, in a specific implementation process, pictures of a plurality of indoor scenarios and pictures of a plurality of outdoor scenarios may be collected and added to a scenario sample library for selection from the scenario sample library during synthesis for a negative sample. Specifically, the selection may be performed randomly or according to an order. This is not limited in this embodiment of this application. The scenario sample may be a scenario photo or a scenario video. In addition, in addition to the pictures of the plurality of indoor scenarios and the pictures of the plurality of outdoor scenarios, the scenario photo may include a pure color background such as a white wall or a blue sky.

According to this embodiment of this application, the scenario sample may also be pre-processed, so that a size of the scenario sample is consistent with the size of the intermediate sample.

The intermediate sample and the scenario sample may be fused through calculation by using the following formula:

$$F = S'*M + B*(1-M)$$

F represents a finally obtained negative sample, S' represents an intermediate sample, M represents a mask, and B represents a pre-processed scenario sample.

As shown in FIG. 9, for example, the intermediate sample is the intermediate sample obtained in step 305, that is, the intermediate sample (the third intermediate sample 901) after the geometric distortion. A process of fusing the third intermediate sample 901 and a scenario sample (a scenario picture 902) is essentially replacing a region where the mask 904 is located in a pre-processed scenario sample with the mask 904 of the intermediate sample, and retaining a region outside the mask 904 in the pre-processed scenario sample unchanged, to obtain a negative sample 903.

In this embodiment of this application, when the positive sample is a picture, the obtained negative sample is correspondingly a picture. When the positive sample is a video, the obtained negative sample is correspondingly a video.

In this embodiment of this application, after obtained, the negative sample may be added to the negative sample library to train a face recognition model for learning. Therefore, this embodiment of this application further provides a method for training a face recognition model. In the method, a model may be trained for learning in combination with an obtained positive sample and a negative sample obtained by using the method for generating a negative sample of face recognition according to this embodiment of this application, to obtain a final face recognition model. A type of the mode is not limited in this embodiment of this application, which may be, for example, a neural network model or genetic algorithm model, or another possible model.

Correspondingly, this embodiment of this application further provides a face authentication method. In the method, live face authentication may be performed through a face recognition model obtained through training by using the method for training a face recognition model. The method may be applied to a plurality of application scenarios, for example, may be applied to, but not limited to, the application scenarios shown in FIG. 1A and FIG. 1B.

In this embodiment of this application, a negative sample required for machine learning of face recognition may be obtained by simulating a scenario in which an attack is performed by using a negative sample in life scenarios. In this way, many negative samples may be generated according to positive samples, so that the technical problem of an excessively small quantity of negative samples because of a small quantity of attacks in face recognition in life may be effectively resolved, thereby improving the performance of a face recognition model obtained through training. In addition, in the foregoing steps, may random elements may be added. For example, a negative sample template, a reflective picture, or a scenario sample may be randomly selected, a weight of the reflective picture may be randomly selected, and a transformation parameter of perspective transformation may also be randomly selected. Then in theory, an infinite quantity of negative samples may generated. This greatly improves the performance of the model.

Figure 10:
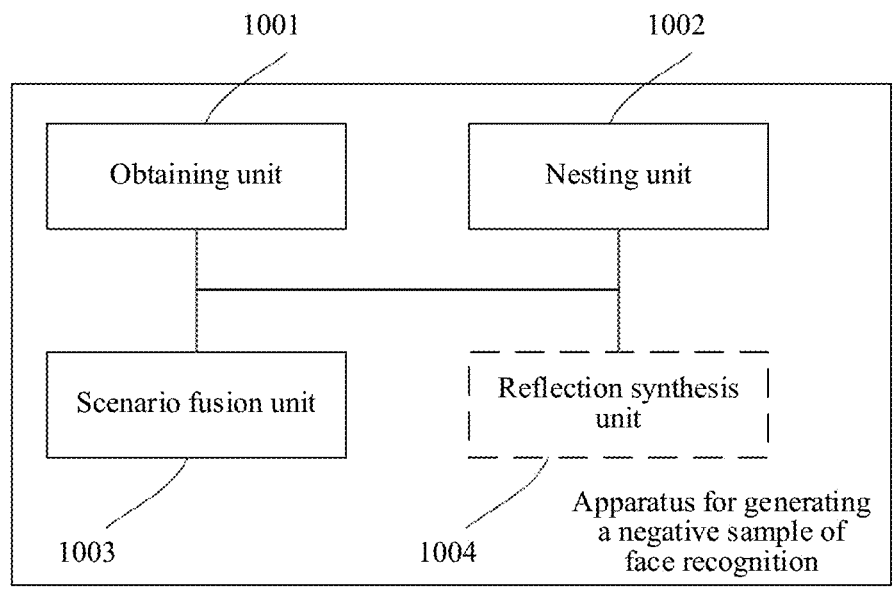
FIG. 10 is a schematic structural diagram of an apparatus for generating a negative sample of face recognition according to an embodiment of this application.

Referring to FIG. 10, based on the same invention concept, an embodiment of this application further provides an apparatus for generating a negative sample of face recognition. The apparatus may include:

an obtaining unit 1001, configured to obtain a positive sample from a training sample library required for machine learning of face recognition;

an embedding unit 1002, configured to embed the obtained positive sample in a selected negative sample template, to obtain an intermediate sample that simulates displaying of the positive sample in a display region of the negative sample template; and a scenario fusion unit 1003, configured to fuse the intermediate sample in a selected scenario sample, to obtain a negative sample required for machine learning of face recognition.

According to this embodiment of this application, the embedding unit 1002 may be specifically configured to:

pre-process the positive sample so that a pre-processed positive sample is adapted to a size of the display region of the negative sample template; and embed the pre-processed positive sample in the display region of the negative sample template.

According to this embodiment of this application, the apparatus may further include a reflection synthesis unit 1004.

The reflection synthesis unit 1004, configured to pre-process a selected reflective picture based on a size of the intermediate sample; and perform the following processing on the intermediate sample: using the intermediate sample as a foreground, and synthesizing the intermediate sample and the pre-processed reflective picture, to simulate reflections of the reflective picture in the intermediate sample.

According to this embodiment of this application, the reflection synthesis unit 1004 may be specifically configured to:

synthesize the intermediate sample and the pre-processed reflective picture according to a first weight value of the intermediate sample and a second weight value of the reflective picture, the first weight value being greater than a preset weight threshold, the second weight value being less than or equal to the preset weight threshold.

According to this embodiment of this application, the scenario fusion unit 1003 may be further specifically configured to:

perform at least one geometric distortion on the intermediate sample, the intermediate sample after the geometric distortion including a mask used for indicating a position of the intermediate sample before the geometric distortion in the intermediate sample after the geometric distortion; and fuse the intermediate sample after the geometric distortion in the scenario sample according to the mask.

According to this embodiment of this application, the negative sample template is, for example, a template of a terminal with a display function, and the display region is a display screen region of the terminal; and/or the scenario sample includes a scenario photo or a scenario video.

The apparatus may be configured to perform the methods provided in the embodiments shown in FIG. 3 to FIG. 8. Therefore, for functions or the like that can be implemented by functional modules of the apparatus, refer to the description of the embodiments shown in FIG. 3 to FIG. 8. Details are not described herein again. Although the reflection synthesis unit 1004 is shown in FIG. 10, it needs to be known that the reflection synthesis unit 1004 is an optional functional unit, and therefore the reflection synthesis unit is shown with a dashed line in FIG. 10.

Figure 11:
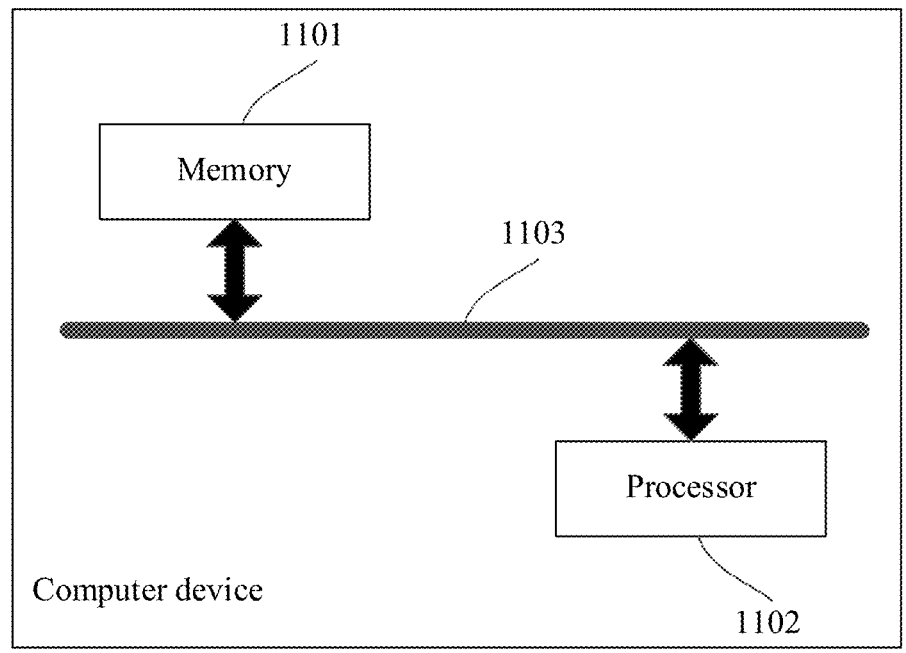
FIG. 11 is a schematic structural diagram of a computer device according to an embodiment of this application.

Referring to FIG. 11, based on the same technical concept, an embodiment of this application further provides a computer device. The computer device may include a memory 1101 and a processor 1102.

The memory 1101 is configured to store a computer program executed by the processor 1102. The memory 1101 may mainly include a program storage area and a data storage area. The program storage area may store an operating system, an application program required by at least one function, and the like. The data storage area may store data created according to usage of the computer device, and the like. The processor 1102 may be a central processing unit (CPU), a digital processing unit, or the like. In this embodiment of this application, a specific connection medium between the memory 1101 and the processor 1102 is not limited. In this embodiment of this application, in FIG. 11, the memory 1101 and the processor 1102 are connected by using a bus 1103. The bus 1103 is represented by using a bold line in FIG. 11. A manner of connection between other components is only schematically described, but is not used as a limitation. The bus 1103 may include an address bus, a data bus, a control bus, or the like. For ease of representation, only one bold line is used to represent the bus in FIG. 11, but this does not mean that there is only one bus or only one type of bus.

The memory 1101 may be a volatile memory, such as a random access memory (RAM). Alternatively, the memory 1101 may be a non-volatile memory, such as a read-only memory (ROM), a flash memory, a hard disk drive (HDD), or a solid-state drive (SSD). Alternatively, the memory 1101 is, but not limited to, any other medium that may be used to carry or store expected program code that has an instruction or data structure form and that can be accessed by a computer. The memory 1101 may be a combination of the foregoing memories.

The processor 1102 is configured to perform, when invoking the computer program stored in the memory 1101, the method for generating a negative sample of face recognition, the method for training a face recognition model, and the live face authentication method that are provided in the embodiments shown in FIG. 3 to FIG. 8.

An embodiment of this application further provides a computer storage medium, storing a computer executable instruction required to be executed by the foregoing processor, including a program required to be executed by the foregoing processor.

In some possible implementations, aspects of the method for generating a negative sample of face recognition, the method for training a face recognition model, and the live face authentication method provided in this application may be further implemented in a form of a program product. The program product includes program code. When the program product is run on a computer device, the program code is used for causing the computer device to perform the steps of the method for generating a negative sample of face recognition, the method for training a face recognition model, and the live face authentication method according to the exemplary implementations of this application described in this specification. For example, the computer device may perform the method for generating a negative sample of face recognition, the method for training a face recognition model, and the live face authentication method that are provided in the embodiments shown in FIG. 3 to FIG. 8.

The program product may adopt one or any combination of readable media. The readable medium may be a readable signal medium or a readable storage medium. The readable storage medium may be, for example but not limited to, an electrical, magnetic, optical, electromagnetic, infrared, or semiconductor system, apparatus, or device, or any combination thereof. More specific examples (a non-exhaustive list) of the readable storage medium include an electrical connection having one or more wires, a portable disk, a hard disk, a RAM, a ROM, an erasable programmable read-only memory (EPROM or flash memory), an optical fiber, a portable compact disk read-only memory (CD-ROM), an optical storage medium, a magnetic storage medium, or any appropriate combination thereof.

The program product of the method for generating a negative sample of face recognition, the method for training a face recognition model, and the live face authentication method in the embodiments of this application may use the CD-ROM and include program code, and may be run on a computer device. However, the program product in this application is not limited thereto. In this application, the readable storage medium may be any tangible medium including or storing a program, and the program may be used by or used in combination with an instruction execution system, an apparatus, or a device.

The readable signal medium may include a data signal propagated in baseband or propagated by a part of a carrier, and readable program code is carried therein. The propagated data signal may have a plurality of forms, including but not limited to, an electromagnetic signal, an optical signal, or any suitable combination thereof. The readable signal medium may alternatively be any readable medium other than the readable storage medium. The readable medium may be used for sending, propagating, or transmitting a program used by or used in combination with an instruction execution system, an apparatus, or a device.

The program code included in the computer-readable medium may be transmitted by using any appropriate medium, including but not limited to: a wireless medium, a wire, an optical cable, RF, any suitable combination thereof, or the like.

The program code used for executing the operations of this application may be written by using one or more programming languages or a combination thereof. The programming languages include an object-oriented programming language such as Java, C++ and the like, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a local area network (LAN) or a wide area network (WAN), or may be connected to an external computing device (for example, through the Internet by using an Internet service provider).

Although a plurality of units or sub-units of the apparatus are described in the foregoing detailed description, such division is merely exemplary rather than mandatory. Actually, according to the embodiments of this application, features and functions of two or more units described above may be specified in one unit. Conversely, the features or functions of one unit described above may further be divided and specified by a plurality of units.

Although the operations of the method in this application are described in a specific order in the accompanying drawings. This does not require or imply that the operations have to be performed in the specific order, or all the operations shown have to be performed to achieve an expected result. Additionally or alternatively, some steps may be omitted, and a plurality of steps are combined into one step to be performed, and/or one step is divided into a plurality of steps to be performed.

A person skilled in the art is to understand that the embodiments of this application may be provided as a method, a system, or a computer program product. Therefore, this application may use a form of a hardware-only embodiment, a software-only embodiment, or an embodiment combining software and hardware. Moreover, a form of a computer program product that is implemented on one or more computer usable storage media (including but not limited to a disk memory, a CD-ROM, an optical memory and the like) that include computer usable program code may be used in this application.

This application is described with reference to flowcharts and/or block diagrams of the method, the device (system), and the computer program product according to the embodiments of this application. It is to be understood that computer program instructions may be used for implementing each process and/or each block in the flowcharts and/or block diagrams and a combination of a process and/or a block in the flowcharts and/or the block diagrams. These computer program instructions may be provided to a general-purpose computer, a dedicated computer, an embedded processor, or a processor of any other programmable data processing device to generate a machine, so that the instructions executed by a computer or a processor of any other programmable data processing device generate an apparatus configured to implement a specified function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable devices, thereby generating computer-implemented processing. Therefore, the instructions executed on the computer or another programmable device provide steps used for implementing a specific function in one or more processes in the flowcharts and/or in one or more blocks in the block diagrams.

Although some exemplary embodiments of this application have been described, a person skilled in the art can make changes and modifications to these embodiments once they learn of the basic inventive concept. Therefore, the following claims are intended to be construed as to cover the exemplary embodiments and all changes and modifications falling within the scope of this application.

A person skilled in the art may make various modifications and variations to this application without departing from the spirit and scope of this application. This application is intended to cover these modifications and variations provided that these modifications and variations of this application fall within the scope of the claims of this application and their equivalent technologies.

What is claimed is:

1. A method of generating a negative sample for face recognition performed at a computer device having a processor and memory storing a plurality of programs to be executed by the processor, the method comprising:
    obtaining a positive sample of a face from a training sample library required for machine learning of face recognition;
    embedding the obtained positive sample in a selected negative sample template, to obtain an intermediate sample of the face that simulates displaying of the positive sample in a display region of the negative sample template; and
    fusing the intermediate sample in a selected scenario sample, to obtain a negative sample of the face required for machine learning of face recognition.

2. The method according to claim 1, wherein the embedding the obtained positive sample in a selected negative sample template comprises:
    pre-processing the positive sample according to a size of the display region of the negative sample template; and
    embedding the pre-processed positive sample in the display region of the negative sample template.

3. The method according to claim 1, further comprising:
    before fusing the intermediate sample in a selected scenario sample:
    pre-processing a selected reflective picture based on a size of the intermediate sample; and
    using the intermediate sample as a foreground, and synthesizing the intermediate sample and the pre-processed reflective picture, to simulate reflections of the reflective picture in the intermediate sample.

4. The method according to claim 3, wherein the using the intermediate sample as a foreground, and synthesizing the intermediate sample and a pre-processed reflective picture comprises:
    synthesizing the intermediate sample and the pre-processed reflective picture according to a first weight value of the intermediate sample and a second weight value of the reflective picture, the first weight value being greater than a preset weight threshold, and the second weight value being less than or equal to the preset weight threshold.

5. The method according to claim 3, wherein the fusing the intermediate sample in the scenario sample specifically comprises:
    performing at least one geometric distortion on the intermediate sample, the intermediate sample after the geometric distortion comprising a mask used for indicating a position of the intermediate sample before the geometric distortion in the intermediate sample after the geometric distortion; and
    fusing the intermediate sample after the geometric distortion in the scenario sample according to the mask.

6. The method according to claim 1, wherein the negative sample template is a template of a terminal with a display function, and the display region is a display screen region of the terminal; and/or
    the scenario sample comprises a scenario photo or a scenario video.

7. A computer device, comprising:
    at least one processor; and
    a memory communicatively connected to the at least one processor;
    the memory storing a plurality of programs executable by the at least one processor, the plurality of programs, when executed by the at least one processor, causing the computer device to perform a plurality of operations including:

obtaining a positive sample of a face from a training sample library required for machine learning of face recognition;

embedding the obtained positive sample in a selected negative sample template, to obtain an intermediate sample of the face that simulates displaying of the positive sample in a display region of the negative sample template; and fusing the intermediate sample in a selected scenario sample, to obtain a negative sample of the face required for machine learning of face recognition.

8. The computer device according to claim 7, wherein the embedding the obtained positive sample in a selected negative sample template comprises:

pre-processing the positive sample according to a size of the display region of the negative sample template; and embedding the pre-processed positive sample in the display region of the negative sample template.

9. The computer device according to claim 7, wherein the plurality of operations further comprise:

before fusing the intermediate sample in a selected scenario sample:

pre-processing a selected reflective picture based on a size of the intermediate sample; and using the intermediate sample as a foreground, and synthesizing the intermediate sample and the pre-processed reflective picture, to simulate reflections of the reflective picture in the intermediate sample.

10. The computer device according to claim 9, wherein the using the intermediate sample as a foreground, and synthesizing the intermediate sample and a pre-processed reflective picture comprises:

synthesizing the intermediate sample and the pre-processed reflective picture according to a first weight value of the intermediate sample and a second weight value of the reflective picture, the first weight value being greater than a preset weight threshold, and the second weight value being less than or equal to the preset weight threshold.

11. The computer device according to claim 9, wherein the fusing the intermediate sample in the scenario sample specifically comprises:

performing at least one geometric distortion on the intermediate sample, the intermediate sample after the geometric distortion comprising a mask used for indicating a position of the intermediate sample before the geometric distortion in the intermediate sample after the geometric distortion; and fusing the intermediate sample after the geometric distortion in the scenario sample according to the mask.

12. The computer device according to claim 7, wherein the negative sample template is a template of a terminal with a display function, and the display region is a display screen region of the terminal; and/or the scenario sample comprises a scenario photo or a scenario video.

13. A non-transitory computer-readable storage medium, storing a plurality of programs that, when executed by a processor of a computer device, cause the computer device to perform a plurality of operations including:

obtaining a positive sample of a face from a training sample library required for machine learning of face recognition;

embedding the obtained positive sample in a selected negative sample template, to obtain an intermediate sample of the face that simulates displaying of the positive sample in a display region of the negative sample template; and fusing the intermediate sample in a selected scenario sample, to obtain a negative sample of the face required for machine learning of face recognition.

14. The non-transitory computer-readable storage medium according to claim 13, wherein the embedding the obtained positive sample in a selected negative sample template comprises:

pre-processing the positive sample according to a size of the display region of the negative sample template; and embedding the pre-processed positive sample in the display region of the negative sample template.

15. The non-transitory computer-readable storage medium according to claim 13, wherein the plurality of operations further comprise:

before fusing the intermediate sample in a selected scenario sample:

pre-processing a selected reflective picture based on a size of the intermediate sample; and using the intermediate sample as a foreground, and synthesizing the intermediate sample and the pre-processed reflective picture, to simulate reflections of the reflective picture in the intermediate sample.

16. The non-transitory computer-readable storage medium according to claim 15, wherein the using the intermediate sample as a foreground, and synthesizing the intermediate sample and a pre-processed reflective picture comprises:

synthesizing the intermediate sample and the pre-processed reflective picture according to a first weight value of the intermediate sample and a second weight value of the reflective picture, the first weight value being greater than a preset weight threshold, and the second weight value being less than or equal to the preset weight threshold.

17. The non-transitory computer-readable storage medium according to claim 15, wherein the fusing the intermediate sample in the scenario sample specifically comprises:

performing at least one geometric distortion on the intermediate sample, the intermediate sample after the geometric distortion comprising a mask used for indicating a position of the intermediate sample before the geometric distortion in the intermediate sample after the geometric distortion; and fusing the intermediate sample after the geometric distortion in the scenario sample according to the mask.

18. The non-transitory computer-readable storage medium according to claim 13, wherein the negative sample template is a template of a terminal with a display function, and the display region is a display screen region of the terminal; and/or the scenario sample comprises a scenario photo or a scenario video.

* * * * *